United States Patent [19]

Manseth

[11] Patent Number: 4,864,860

[45] Date of Patent: Sep. 12, 1989

[54] ELECTRICAL APPARATUS FOR A SKI

[76] Inventor: Karl J. Manseth, 650 Harlow Rd. #250, Springfield, Oreg. 97477

[21] Appl. No.: 232,609

[22] Filed: Aug. 15, 1988

[51] Int. Cl.$^4$ .............................................. G01P 1/00
[52] U.S. Cl. ...................................... 73/490; 73/493; 280/809
[58] Field of Search ................. 73/490, 493; 280/809, 280/611, 612; 310/75 R; 324/166, 168, 173, 174

[56] References Cited

U.S. PATENT DOCUMENTS

| | | | |
|---|---|---|---|
| 3,505,878 | 4/1970 | Moll | 73/493 |
| 3,534,391 | 10/1970 | Bauer | 219/211 |
| 4,262,537 | 4/1981 | Jander et al. | 73/493 |
| 4,298,910 | 11/1981 | Price | 280/809 |
| 4,546,650 | 10/1985 | Cameron | 73/490 |

Primary Examiner—Michael J. Tokar
Assistant Examiner—Michele Simons
Attorney, Agent, or Firm—James D. Givnan, Jr.

[57] ABSTRACT

A generator assembly is swingably mounted on the tail of a ski with a generator wheel for snow surface contact. A carrier component of the generator assembly is vertically positionable to permit retraction of the generator wheel from snow surface engagement. A tubular control member permits remote positioning of the carrier as by a ski pole tip. Pivot means permits horizontal swinging motion of the generator assembly. Speed indicator means are actuated by changes in current flow from the generator. Contacts on a ski binding component permit transfer of electrical current to a ski boot for various purposes.

8 Claims, 1 Drawing Sheet

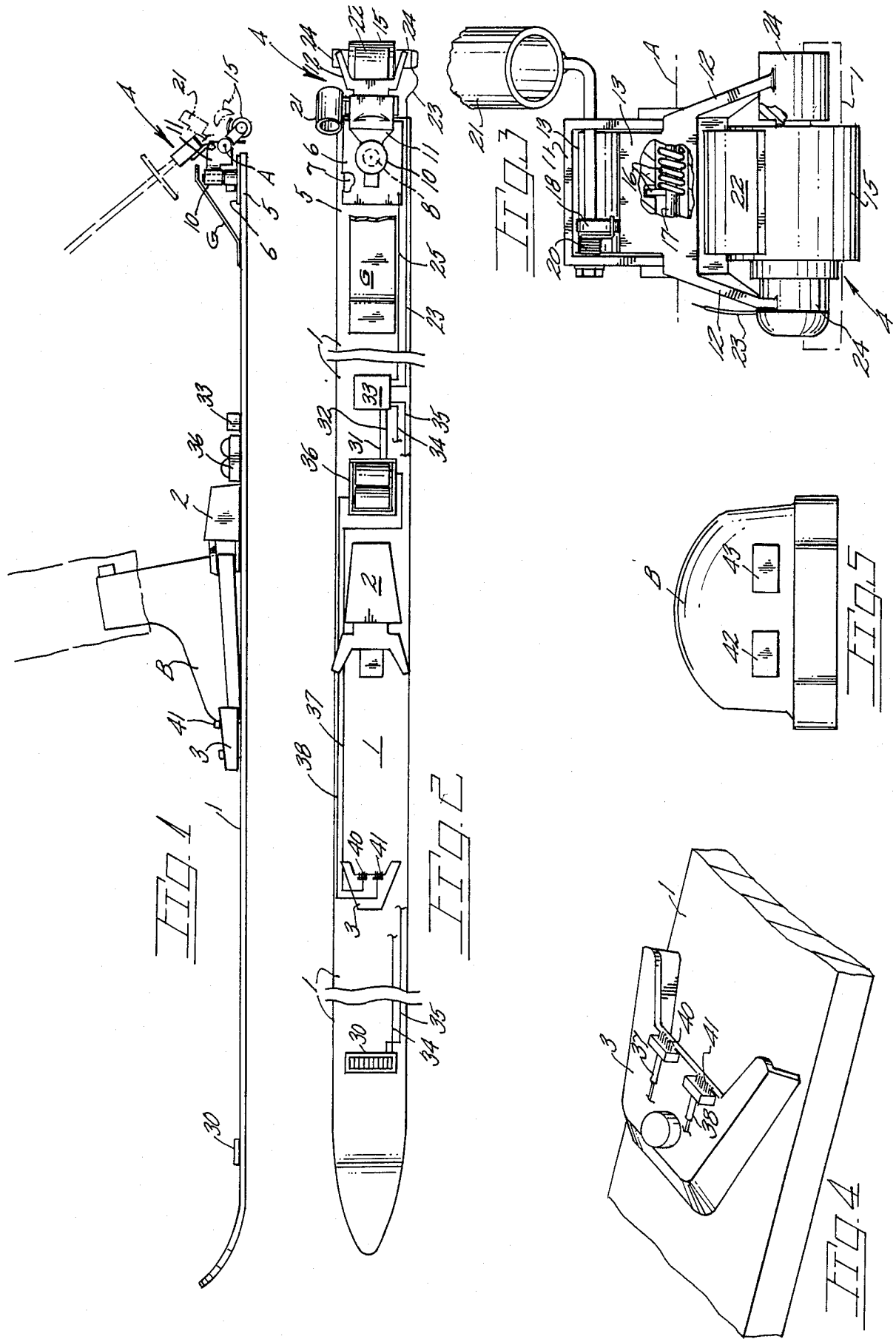

ELECTRICAL APPARATUS FOR A SKI

BACKGROUND OF THE INVENTION

The present invention pertains generally to the generating of electrical current by a ski carried generator.

U.S. Pat. No. 3,534,391 discloses a generator driven by means of a ski attached flexible cable which intermittently drives a generator rotor to provide electrical current a warm a skier. The generator is carried in a housing in place on a ski boot with fore and aft motion of the ski boot causing rotor movement.

U.S. Pat. No. 4,298,910 discloses a skate wheel with a fixed permanent magnet about which rotates a wheel embeded generator winding to energize wheel mounted lights.

U.S. Pat. No. 4,546,650 is of interest in that it utilizes a wheel for running on snow with wheel carried magnets rotating past a Hall effect sensor with magnetic field changes being fed to a microcomputer and a digital display on a circuit board. A battery powers the system. Both speed and distance displays are provided.

U.S. Pat. No. 3,505,878 shows gear driven speed and distance indicators pivotally mounted on the tail of a ski.

SUMMARY OF THE PRESENT INVENTION

The present invention is embodied within an electrical system for a ski having a generator positionably mounted on the ski and providing a current flow for selected purposes.

The generator is intended for trailing about an upright pivot axis to prevent any interference with tracking of the ski over the snow in the normal manner. Additionally, provision is made for retraction of the generator wheel when desired by a skier upon actuation of wheel positioning means. Provision is made for providing a speed indicator forwardly viewable by the skier as well as providing a current flow to a ski binding member for transfer to a boot therein for heating purposes.

Important provisions of the present invention include the provision of a generator attachable to a ski in a manner permitting a generator wheel to be driven by passage over the snow to provide electrical current for multiple purposes; the provision of a generator and ski combination with a generator assembly including upright pivot means enabling pivoted tracking of a generator wheel so as to not interfere with ski function; the provision of a ski mounted generator assembly with a speed indicator the latter responsive to current fluctuations from generator speed changes; the provision of a generator assembly in place on a ski with generated current being utilized for recharging of ski carried batteries which in turn provide current to conductors carried by a skier's boot; the provision of a generator assembly providing electrical current to a conductor in place on a ski binding member for current transfer to conductive means on the ski boot in place within the ski binding; the provision of a generator assembly in place on a ski with the generator assembly including a control for retracting a generator wheel out of contact with a snow surface.

BRIEF DESCRIPTION OF THE DRAWINGS

In the accompanying drawings:

FIG. 1 is a side elevational view of a ski equipped with the present electrical apparatus;

FIG. 2 is an enlarged plan view of FIG. 1 sectioned for purposes of illustration;

FIG. 3 is an end elevational view on an enlarged scale of the right-hand end of FIG. 1;

FIG. 4 is a fragmentary perspective view of a ski fragment with the binding toe piece thereon; and FIG. 5 is a front elevational view of a ski boot equipped with electrical contacts.

DETAILED DESCRIPTION OF THE PREFERRED EMBODIMENT

With continuing attention to the drawings wherein applied reference numerals indicate parts similarly hereinafter identified, the reference numeral 1 indicates a snow ski equipped with heel and toe binding components at 2 and 3. Said components may be deemed conventional except as later elaborated upon.

Indicated generally at 4 is a generator assembly in place on the tail 5 of the ski. A base plate 6 of the generator assembly may be attached by means of an underlying patch 7 of doublesided adhesive material to avoid structural alteration of the ski.

The generator assembly includes pivot means including a post 8 about the upright axis of which swings a sleeve 10. The generator assembly additionally includes a housing 11 which may swing freely about post 8. A carrier 13 in housing 11 has a pair of trailing arms as at 12 which carry a generator wheel 15 for travel along the snow surface. A helical spring 16 on a carrier supporting shaft 17 urges arms 12 and wheel 15 downwardly. A cam 18 is spring biased at 20 and functions to rock carrier 13 in a counterclockwise direction, as viewed in FIG. 1, to the raised broken line position out of snow contact. Spring 20 retains cam 18 in a raised, over center position to effect retraction of carrier 13 upon rearward positioning of a control member 21 which moves carrier 13 against the action of the spring 16. Accordingly, wheel 15 is positionable about a horizontal axis A of shaft 17. The wheel 15 is normally in a lowered position to track in a free manner over the snow surface and upon rearward movement of control 21 to the broken line position of FIG. 1 wheel 15 is lifted from snow contact to a raised inoperable position. Control 21 is tubular to permit remote positioning of same upon insertion of a ski pole tip. A fender at 22 on carrier 13 serves to prevent snow build up on wheel 15. A suitable generator assembly is that manufactured by the Sanyo Electric Co., Ltd. of Japan and sold under the trademark Dynapower.

A wire lead 23 terminates interiorly of a wheel axle assembly 24 while a ground wire 25 is attached to generator base 6.

Wire leads 23 and 25 extend forwardly from the generator assembly and terminate at a rectifier 33. Conductors 34 and 35 provide direct current to speed indicator means shown as a bar graph display at 30. Said display includes light emitting diodes which illuminate progressively depending upon current flow within conductors 34 and 35. Accordingly, bar graph display 30, located on the fore part of the ski, is progressively illuminated to provide the skier an indication of speed. A suitable bar graph display of the LED type is marketed by Radio Shack (a registered trademark).

Leads at 31 and 32 which provide a current flow to a battery charging unit 36. For providing current flow to a ski boot at B, a pair of conductors 37 and 38 extend from the battery recharger unit to contact means 40–41 in place on a ski binding component shown as toe piece 3. The ski boot B, as shown in FIG. 5, is equipped with a pair of plates 42 and 43 which serve to engage contact means 40–41 to provide current to the ski boot and thence to whatever electrically powered accessory the skier desires or item of electrically heated apparel worn by the skier.

A suitable rectifier 33 is that manufactured by NTE Electronics and identified as bridge rectifier 5312 S1 by the manufacturer.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. An apparatus for attachment to a ski equipped with binding components, said apparatus comprising, a generator assembly including an electrical generator having a wheel for passage over a surface for wheel rotation and electrical current generation, a base plate for ski attachment, pivot means carried by said base plate, a carrier in place on said pivot means and including arm means supporting said wheel, control means acting on said carrier for positioning said wheel relative said surface, said pivot means adapted for travel about an upright axis about which said wheel may swing, and speed indicator means for placement on said ski and responsive to changes in generator output to provide a signal to a skier indicative of ski speed.

2. An apparatus for attachment to a ski equipped with binding components, said apparatus comprising, a generator assembly including an electrical generator having a wheel for passage over a surface for wheel rotation and electrical current generation, a base plate for ski attachment, pivot means carried by said base plate, a carrier in place on said pivot means and including arm means supporting said wheel, said pivot means adapted for travel about an upright axis about which said wheel may swing, speed indicator means for placement on said ski and responsive to changes in generator output to provide a signal to a skier indicative of ski speed, current rectifying means in circuit with said generator and said speed indicator means, and a battery and battery charging means also in circuit with said rectifying means whereby rectified current will charge said battery.

3. The apparatus claimed in claim 1 wherein said battery is in circuit with a pair of conductors and contacts for cooperation with contacts on a ski boot in said binding components.

4. The apparatus claimed in claim 1 wherein said generator assembly additionally includes control means acting on said carrier for positioning said wheel relative said surface.

5. The apparatus claimed in claim 4 wherein said control means is tubular for the reception of a ski pole tip.

6. The apparatus claimed in claim 4 wherein said carrier houses a helical spring biasing the carrier to urge said wheel thereon into surface contact.

7. The apparatus claimed in claim 6 wherein said control means includes a cam acting on said carrier to position same in opposition to the action of said helical spring.

8. The apparatus claimed in claim 1 wherein said generator assembly includes a non-rotatable axle assembly.

* * * * *